C. H. SMITH.
LIGHTNING-ROD CONNECTIONS.
No. 183,426.  Patented Oct. 17, 1876.
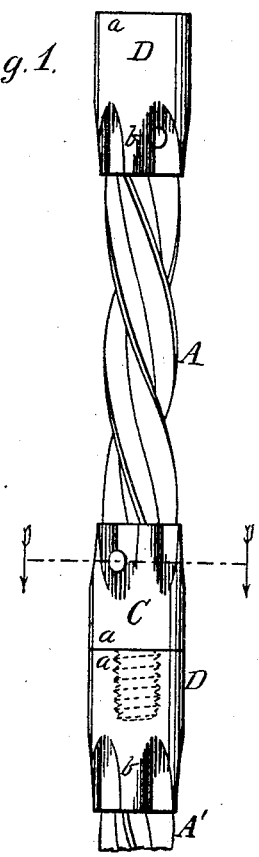
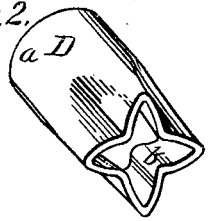
WITNESSES
Villette Anderson
Mary Utty.
INVENTOR
Charles H. Smith,
by E. W. Anderson,
ATTORNEY

UNITED STATES PATENT OFFICE.

CHARLES H. SMITH, OF CHICAGO, ILLINOIS.

IMPROVEMENT IN LIGHTNING-ROD CONNECTIONS.

Specification forming part of Letters Patent No. 183,426, dated October 17, 1876; application filed August 5, 1876.

*To all whom it may concern:*

Be it known that I, CHARLES H. SMITH, of Chicago, in the county of Cook and State of Illinois, have invented a new and valuable Improvement in Lightning-Rod Connections; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of this invention. Fig. 2 is a perspective view of one of the coupling-sections. Fig. 3 is a cross-section of the same applied to a rod.

This invention has relation to connections for grooved, indented, or ribbed lightning-rods; and it consists, mainly, in the construction and novel arrangement of the screw and burr coupling-sections, each having a socket or hollow portion, whereof the wall is compressed into the re-entering angles of the rod, and suitably fastened thereto, as hereinafter shown and described.

In the accompanying drawings, the letter A designates a ribbed lightning-rod section, and A' another designed to be joined thereto. These are respectively provided with the screw and burr coupling-sections C and D, whose adjacent or body portions $a$ are solid, terminating in hollow ends $b$, into which the ends of the rod-sections are received. These hollow ends are then compressed on the rod, so as to force the metal of the wall of each closely against the copper exterior of the rod, and thoroughly fit them together in the re-entering as well as the salient angles.

Such a fastening is especially adapted to screw-couplings, because of the firm connection between the rod and coupling.

The coupling-section may be still further secured to the rod by a rivet, by soldering, or brazing; or, when the rod is of suitable construction, as when it is made with a core and sheath, or is hollow, the fastening may be made by inserting a small wedge in the end of the rod. Then, by driving on the coupling-section, the end of the rod is expanded in the hollow thereof, and a sort of dovetail formed which is very secure.

The compressed wall of the coupling-section serves an important purpose in holding the sheathing of composite rods in place.

If the rod is twisted, the coupling-section can be made with the indentations spirally formed to fit those of the rod.

I do not desire to be confined to straight or spiral indentations, nor to any special number thereof.

The coupling-sections are designed to be first turned in cylinder form, and the walls of the hollow ends are then bent inward at the proper points to form the indentations of the convolutions.

What I claim as new, and desire to secure by Letters Patent, is—

The couplings for lightning-rod sections, having solid bodies provided with screw connections at their adjacent ends, and extended at their opposite ends to form hollow cylindrical compressed convoluted walls $b$, adapted to fit the grooves and ribs of said sections, substantially as specified.

In testimony that I claim the above I have hereunto subscribed my name in the presence of two witnesses.

CHARLES H. SMITH.

Witnesses:
CHARLES A. MOORE,
WILLIAM LORIMER.